United States Patent Office 3,213,067
Patented Oct. 19, 1965

3,213,067
METHOD OF PREPARING UNSATURATED POLY-
ESTER RESINS FROM ALKYLENE OXIDES AND
ETHYLENICALLY UNSATURATED DICARBOX-
YLIC ACID ANHYDRIDES
Raymond A. Pohl, Syracuse, and Michael J. Skrypa,
Camillus, N.Y., and William J. Connolly, Florham
Park, N.J., assignors to Allied Chemical Corporation,
New York, N.Y., a corporation of New York
No Drawing. Filed Dec. 7, 1961, Ser. No. 157,816
9 Claims. (Cl. 260—78.4)

The invention relates generally to the production of linear polyesters that contain ethylenically unsaturated dicarboxylic acid or anhydride residues in the polymer chain, and more particularly, to a method of preparing such linear polyesters that are particularly suitable for eventual cross-linking with an ethylenically unsaturated monomeric compound.

Conventionally, unsaturated polyester resins are prepared by reaction of a glycol or glycols with a mixture of ethylenically unsaturated and saturated dicarboxylic acids or their anhydrides as illustrated by the following general equation:

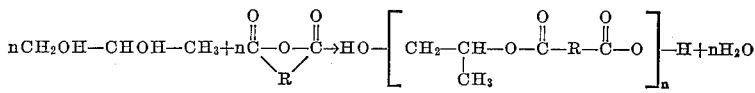

Typical of such polyesters, and finding wide application in the casting and laminating fields amongst others, an specifically in the manufacture of such products as boats, "fiber-glass" panels, and truck and sports car bodies, for example, are the unsaturated polyesters prepared by the reaction of propylene glycol with a mixture of maleic and phthalic acid anhydrides. Under typical esterification conditions for such reaction, heating at elevated temperatures of the order of 200° C. is usual, which may degrade the product. Since the esterification reaction comprises a condensation mechanism, the water evolved must be removed, and this frequently necessitates the application of vacuum. Because the process requires the application of the high temperatures referred to, and reflux in at least the initial stages of the esterification, as well as separation and diversion of the evolved water; the equipment required therefor is elaborate and expensive.

It has been proposed to produce polyesters by reaction of alkylene oxides with acid anhydrides thus avoiding the necessity for eliminating water. It has also been proposed to introduce alkaline or acid catalysts to accelerate the reaction, and water to assist the catalysis. Products previously prepared by such processes, however, have not possessed all of the desirable characteristics of polyester products obtained from glycols.

It is a primary object of the present invention to provide a method of preparing unsaturated polyesters from alkylene oxides and ethylenically unsaturated dicarboxylic acid anhydrides, which, compared to the conventional methods of preparing polyesters from glycols and acids and/or anhydrides, provides advantageous economies in raw material cost and reaction time.

It is a further object to provide by such a process polyesters that cure satisfactorily with cross-linking ethylenically unsaturated monomeric compounds, such as styrene, to provide products having acceptable physical characteristics.

The above and other objects and advantages are obtained by a process which comprises: (A) reacting together at temperatures within the range of 30° to 150° C. (1) a substance selected from the group consisting of maleic acid anhydride and mixtures of maleic acid anhydride with anhydrides of other dicarboxylic acids, said mixtures containing at least 10 mol percent of maleic acid anhydride, with (2) an alkylene oxide selected from the group consisting of ethylene, propylene and butylene oxides, and mixtures of said oxides, in the presence of (a) from 0 to 5.0%, based on the weight of the reaction mixture, of a catalyst selected from the group consisting of alkali metal salts, alkali metal hydroxides, alkaline earth metal salts, alkaline earth metal hydroxides, salts of organic amines, and hydroxides of organic amines; and (b) from 0 to 4 gram mols of water per 1000 grams of (1) and (2) and the minimum total amount of said catalyst and said water is at least .0075 gram mol per 1000 grams of (1) and (2), until a product having an acid number of from above 40 to 240 is obtained; and (B) thereafter, heat treating said product at a temperature of from about 180° to 250° C. It has been found that the latter heat treatment of said unsaturated polyester product, which has an acid number within the specified range, unexpectedly converts it to a product eminently suitable for curing with ethylenically unsaturated monomers such as styrene.

It has further been found that an efficient method for obtaining control of the acid number is to add the alkylene oxide in two increments. In the initial charge, an essentially stoichiometric amount of the alkylene oxide is preferably employed, and after high temperature treatment of the polyester having an acid number in the aforesaid range, an excess sufficient to bring the acid number to the commercially acceptable 20–40 range is added. Alternatively, the desired effect may be achieved by addition of all of the alkylene oxide and addition of acid sufficient to provide an acid number of above 40 to 240 before the heat treatment and later addition of an alkaline substance so that the finished polyester product has an acid number in the aforesaid commercial range of 20–40.

As referred to previously, it is conventional in the polyester art to include anhydrides of organic dicarboxylic acids, other than maleic, in the reaction mixtures, whereby such other acid anhydride residues are included in the polyester chain. This is done to impart flexibility, flameresistance, and/or other desirable property to the finally-cured monomer-cross-linked product, and/or for purposes of lowering the costs of materials. Examples of acid anhydrides suitable for the foregoing and other purposes include phthalic anhydride, succinic anhydride, glutaric anhydride, octenyl succinic anhydride, diglycollic acid anhydride, thiodiglycollic acid anhydride, tetrahydrophthalic anhydride, tetrachlorophthalic anhydride, and similar mono-, di-, or tri-substituted phthalic anhydrides, Diels-Alder adducts of cyclopentadiene (or substituted (e.g., hexachloro) derivatives thereof) and maleic acid anhydride, and the like. Such inclusion of acid anhydrides other than maleic acid anhydride has been found to result in useful unsaturated polyesters as long as the mol proportion of the latter anhydride is not below 10 mol percent of total acid anhydride employed. It has been found preferable, however, for most commercial applications to have the mol proportion no lower than 20 mol percent.

While propylene oxide is the preferred alkylene oxide to be utilized in this invention, other alkylene oxides, such as ethylene oxide and butylene oxide, may be substituted therefor in whole or in part. During the reaction between the organic dicarboxylic acid anhydride and the alkylene oxide, the latter, if present in amounts substantially greater than the stoichiometric equivalent of the anhydride used, tends to condense with itself to some extent to form diglycol and polyglycol ester units in the polyester chain. Hence, in certain instances, it may be desirable to have the ratio of alkylene oxide and acid anhydride reactants up to as high as 4:1 to obtain the desired acid number. Since there appears to be no tendency on the part of the acid anhydrides to condense with themselves and thereby repeat themselves in the chain, no advantage appears obtainable by reducing the ratio of alkylene oxide to anhydride to below 0.9:1.0 ratio.

To produce under normal operating conditions a commercially acceptable resin of 30 acid number in the conventional molecular weight range of 1000 to 1500, an alkylene oxide to acid anhydride molar ratio of 1.17:1 has been found to be preferable. When the alkylene oxide is added in two increments, the stoichiometric amount plus 5% excess is preferably added in the initial reactor charge and the remainder is added after completion of the high temperature treatment.

In order to initiate the reaction of epoxide and anhydried to produce a polyester from these materials, a small amount of water is provided. It has further been found that a mol of water is required for every mol of polyester to be produced. The balanced equation below, wherein R represents an alkylene or alkenyl group, is illustrative of the mechanism of the subject process:

In the presence of a small quantity of sodium hydroxide, for example, the reaction proceeds more smoothly and yields a clear resin. It is preferred that the catalyst be employed in proportion of from about 0.05 to 5% based on the weight of the reaction mixture. Catalysts suitable for use in the present invention include, for example, sodium hydroxide, sodium chloride, sodium acetate, sodium phthalate, sodium ethoxide, barium chloride, calcium chloride, calcium hydroxide, potassium nitrate, diethylcyclohexylamine, morpholine, dimethylamine, diethylenetriamine, and the like.

As pointed out above, a mol of water is required for every mol of polymer to be produced. The total water charge for the reaction batch is given by the following equation:

$$\text{Moles water} = \frac{W}{M}$$

wherein W is the weight of the anhydride and oxide constituents of the reaction batch, and M is the molecular weight of the desired polyester.

The actual water charge that must be included in the reaction mass is equal to the above value minus the number of mols of catalyst employed in the reaction. It was found that resins of viscosity equal to G to I on the Gardner-Holdt scale (60% solids in methyl Cellosolve) are obtained by basing water calculations on a molecular weight of 1200. For production of polyesters having a molecular weight of the order just stated, it has been found preferable to include a minimum of 0.5% water based on the total weight of anhydride and oxide reactants present. Preferably, the amount of water present should not exceed a proportion of 4 gram mols per 1000 grams of anhydride and oxide since the lower molecular weight polyesters (of the order of 250 mol. wt.) normally produced when greater amounts of water are included lack commercial utility.

It is feasible to produce polyesters of higher molecular weights within the presently commercial range even though comparatively larger amounts of water may be present initially by protracted heating whereby the esterification eventually continues with elimination of water as the polyester chains build up. However, for production of polyesters having much higher molecular weights, such as of the order of 100,000, it is necessary to have present a minimum total amount of catalyst and water in the proportion of at least .0075 gram mol per 1000 grams of anhydride and oxide. As stated hereinbefore, re-

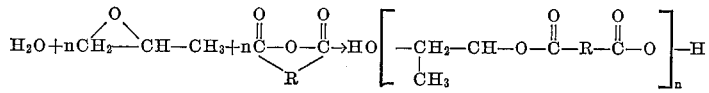

The reactions between alkylene oxides and organic dicarboxylic acid anhydrides involved in the process of the present invention are greatly accelerated by the presence as catalyst of strong bases and hydroxides and salts thereof. Such catalysts may comprise as the cationic portion, for example, alkali and alkaline earth metal ions and primary, secondary, tertiary and quaternary organic ammonium ions. The anionic portions of such catalysts may include organic acyl radiacls, chloride ions, nitrate ions, hydroxy ions, alkoxy ions, etc.

While it has been found that propylene oxide, for example, does react with a mixture of maleic and phthalic anhydrides in the absence of any catalyst, the resultant resin contains a suspension of solid phthalic anhydride.

action without any catalyst is feasible. In the absence of water, the catalyst has been found to function also as initiator. Thus, when desirable, water may be omitted.

In carrying out the method of the invention, very simple equipment may be used. For example, any reaction kettle that is closable and sufficiently strong to withstand moderate pressures generated by the alkylene oxides under reaction conditions and that may be provided with conventional heating and cooling means and means for agitation, may be used. Preferably, the kettle should also be equipped for evacuation, as the reaction product is oxygen-sensitive. For such purpose, a steam-jet ejector capable of reducing the pressure by 29½–30″ Hg has been found suitable.

The solid reactants, e.g., maleic acid anhydride and phthalic acid anhydride, as well as the water and the catalyst selected, are preferably charged to the reactor, which is then sealed and preferably evacuated. Optionally, the reactor may be purged with inert gas prior to evacuation. The alkylene oxide may then be pumped into the reactor and agitation and heating initiated.

Reaction, as indicated by evolution of reaction heat and by reactor pressure change, begins in the temperature range of 70°–80° C. The vapor pressure of the reaction mass at this point should preferably not exceed about 20 to 30 p.s.i.g. As will be understood by those skilled in the art, any excess reaction heat may be removed by standard heat transfer mechanism. Generally, during the reaction period prior to the heat treatment step described in detail hereinafter, the temperature should be kept within the range of 30°–150° C., and preferably in the temperature range of 70°–110° C., in which range the entire reaction can be carried out rapidly and conveniently.

As the reaction progresses, the temperature may be continuously elevated so that the reaction vapor pressure is maintained at 30 p.s.i.g. The continuously rising temperature compensates, at least in part, for the decelerating effect of decreasing alkylene oxide and dicarboxylic acid solution concentrations on the reaction rate, so that a fairly good rate may be achieved throughout the reaction interval. After approximately one hour of reaction time, during which time the temperature is preferably caused to rise into a 100°–110° C. range, the reactor pressure normally begins to drop rapidly, indicating essentially complete consumption of the alkylene oxide.

For the subsequent heat treatment step, the reaction temperature is preferably raised to 210° C. and the reaction mass held at this temperature for approximately two hours, and preferably not less than one and one-half hours. While, as stated previously, the acid number of the product to be heat treated should be in the range of from above 40–240, best results are obtained when said acid number is in the preferred range of 65–125. As the temperature is elevated toward 210° C., the vapor pressure in the reactor continues to fall until a vacuum of about 25–30 inches Hg is reached. The pressure then starts to climb gradually and reaches a value of approximately 10 p.s.i.g. after two hours at 210° C. The heat treatment time may be diminished considerably and even to a flash heating operation under properly chosen conditions. For example, the pressure and/or the heating surfaces may be increased, e.g., the transfer of heat to thin films of the reaction mass may be utilized to accomplish such end.

Upon completion of the heat treatment, the reaction mass is preferably cooled to about 100° C. and the second increment of alkylene oxide is then added. The additional alkylene oxide may be consumed in about 30 minutes, whereupon the resultant resin may then be treated with hydroquinone and cut with styrene in the conventional manner for producing final polyester-monomer compositions.

In some instances it may be desirable to employ an inert gas purge during the high temperature treatment. In such case, the reaction mass should be kept in the 100°–125° C. range until all oxide is consumed as indicated by attainment of a good vacuum in the reactor. The purge gas may then be turned on and the heat treatment carried out in the usual way. However, it has been found that purging as described may cause loss of about 10% of the reaction mass, but that the resin acid number is reduced to the 20–30 range during the purge.

It has been found that the overall process time for preparing a batch of heat-conditioned polyester resin in accordance with the present invention is normally of the order of 5–6 hours, which may be reduced considerably by utilization of augmented heating and/or pressurizing techniques referred to hereinbefore, whereas with the conventional procedures utilizing glycols, wherein removal of water of condensation is necessary, the process time is in the range of 11 to 13 hours.

The following examples illustrate the invention:

EXAMPLE 1

A polyester was prepared from the ingredients listed below:

| Ingredients | Parts By Weight | Mols |
| --- | --- | --- |
| $H_2O$ | 14.4 | 0.802 |
| Maleic Anhydride | 263 | 2.68 |
| Phthalic Anhydride | 397 | 2.68 |
| Propylene Oxide | 326 | 5.63 |
| NaOH | 1.25 | 0.0313 |

(A) The solid ingredients were charged to a sealable reactor capable of withstanding pressures of the order of 30 p.s.i.g. and equipped for evacuation thereof, for introduction of liquid reactants under pump pressure, and for agitation and heat exchange of the contents thereof. The reactor was then sealed and evacuated. Liquid reactants were pumped into the reactor and agitation and heating were initiated. Reaction began in the temperature range of 70°–80° C., during which time the vapor pressure of the reaction mass was approximately 15 to 20 p.s.i.g.

As the reaction progressed, the temperature was continuously elevated at such a rate that the vapor pressure in the reactor was always maintained at the working pressure of the reactor, which was 30 p.s.i.g. The higher temperatures were desired to accelerate the reaction, which tends to slow down as the reaction progresses due to propylene oxide consumption. After approximately one hour reaction time, with the temperature in the range of 100° to 110° C., the reactor pressure began to drop rapidly to the vacuum region, indicating essentially complete consumption of propylene oxide. Product acid number was 114.

(B) The reactor temperature was then raised rapidly to 210° C. and the reaction mass was held at this temperature for approximately two hours. At this point, the reaction mass was cooled to about 100° C. and additional propylene oxide (53 parts by weight, equivalent to 0.92 mol) was added to lower the acid number to 31.1.

(C) Upon complete consumption of the additional propylene oxide, 0.125 part hydroquinone and 577 parts styrene were added to the reaction mass. Upon cooling to ambient temperature, this mass constituted the finished thermosettable product.

EXAMPLE 2

The procedure of Examples 1(A), (B) and (C) was repeated utilizing the same formulation except that the amount of maleic acid anhydride was increased so that the molar relationship thereof to phthalic acid anhydride was changed from 1:1 to 1.5:1.

Comparisons of the properties of the two propylene oxide-based polyester resins prepared according to Examples 1(A), (B) and (C) and Example 2, respectively, with those of a commercial polyester resin produced by conventional esterification of glycol and dicarboxylic acid components (i.e., a polyester resin composition designated Plaskon 941, manufactured and sold by the Plastics Division of Allied Chemical Corporation), and with another propylene oxide-based polyester resin prepared in accordance with Examples 1(A) and (C) only (i.e., without the heat treatment step (B)), are given in Table I, below:

Table I.—Properties of propylene oxide-based polyester resins

|  | Example 1. (A) (B) (C) (heat treated) | Example 2. (heat treated) | Example 1. (A) (C) (not not treated) | Plaskon 941 |
|---|---|---|---|---|
| Liquid Resin Properties: |  |  |  |  |
| Polyester Acid No | 31.1 | 46.3 | 35.5 | 30-40 |
| Hydroxyl Number | 43.6 | 38.6 |  | 25-40 |
| Thinned Viscosity (Gardner-Holdt) | V | V |  | T-U |
| Percent Styrene | 34.7 | 36.2 | 35.1 | 33-36 |
| 120° C. Stability, mins | 55 | 50 |  | 40-60 |
| 120° F. Shelf Life, days | 25+ | 25+ |  | 30 |
| Catalyzed Pot Life, days | 7 | 5 | 1 | 7 |
| SPI Gel Time (150-190° F.), mins | 6.7 | 5.8 | 13.5 | 4-5.5 |
| Peak Exotherm, °F | 397 | 411 | 235 | 400-420 |
| Time 190° F. to Peak Exotherm, mins | 2.0 | 1.9 |  | 1.5-2.3 |
| ⅛" Cast Physical Properties: |  |  |  |  |
| Barcol Hardness | 47 | 50 | 36 | 45-50 |
| Specific Gravity, Liquid | 1.119 | 1.116 |  | 1.13 |
| Specific Gravity, Cured | 1.22 | 1.21 |  | 1.22 |
| Volume Shrinkage on Cure, percent | 8.3 | 7.8 |  | 7.4 |
| Flexural Strength, p.s.i. at Room Temperature | 15,500 | 15,700 | 11,900 | 15,000-17,000 |
| Flexural Strength, p.s.i. at 160° F | 8,520 | 10,700 | (¹) | 8,000-11,000 |
| Modulus of Elasticity, p.s.i. at Room Temp | 644,000 | 619,000 | 181,000 | 650,000-690,000 |
| Modulus of Elasticity, p.s.i. at 160° F | 222,000 | 281,000 | (¹) | 250,000-300,000 |
| Tensile Strength, p.s.i. at Room Temperature | 9,100 | 9,900 | 4,530 | 8,000-10,000 |
| Elongation in Tensile, percent | 1.8 | 2.2 | 0.8 | 1.5-1.9 |
| Water Absorption, 24 hours, percent | 0.26 | 0.20 |  | 0.19 |
| Heat Distortion Temperature (264 p.s.i. load) ° C | 81 | 91 |  | 80-90 |

¹ Too flexible to test.

EXAMPLE 3

Table II, below, presents the results of comparisons of different resins for correlating effect of time, temperature and heat treatment with resin curing properties. Resins V–VIII in Table III were identically prepared in accordance with the procedure of Examples 1(A), (B), (C), except that the heat treatment conditions were varied as indicated below:

Table II.—Effect of high temperature treatment on resin gel time

|  | Treatment Cond. | | SPI Gel Time Test | | |
|---|---|---|---|---|---|
|  | Avg. Temp., ° C. | Time, hrs. | Gel Time, min. | Peak Exotherm, ° F. | Time to Peak |
| Example 1. (A) (C) (not heat treated) |  |  | 13.5 | 235 |  |
| Resin V | 205 | 2 | 5.0 | 351 | 2.5 |
| Resin VI | 208 | 2 | 4.0 | 383 | 2 |
| Resin VII | 210 | 1 | 4.0 | 372 | 2.5 |
| Resin VIII | 210 | 1½ | 3.5 | 400 | 2 |

To demonstrate that only resins of relatively high acid number (greater than 40) satisfactorily undergo high temperature conversion in accordance with the present invention, a comparison of several resins is given below in Table III.

Table III.—Effect of acid number on high temperature treatment

|  | Example 2. | Resin VI | Resin IX ³ | Resin X ³ |
|---|---|---|---|---|
| Resin Acid Number | 99 | 68.6 | 35 | 25 |
| Treatment Condition: |  |  |  |  |
| Avg. Temp., ° C | 207.5 | 208 | 208.5 | 208 |
| Time, Hrs | 2.5 | 2.0 | 2.75 | 3.0 |
| SPI Gel Time Test: |  |  |  |  |
| Gel Time, Min | ¹ 4.5 | ¹ ² 4.0 | 5 | 5.5 |
| Peak Exotherm, ° F | 398 | 383 | 329 | 316 |
| Time to Peak, Min | 2.25 | 2.0 | 3.5 | 4 |

¹ Resin acid number was reduced to approximately 35 prior to testing.
² A part of the difference in test results between the resin of Example 2 and Resin VI also is due to the difference in treatment conditions.
³ Resins IX and X were prepared as in Example 2., except for the resin acid number at the time of initiation of the heat treatment as indicated, which was lowered to the values shown by inclusion of additional propylene oxide prior to said initiation.

The foregoing further demonstrates the advantages in charging the alkylene oxide in two increments so that the resin subjected to heat treatment will have a relatively high acid number. It has been found that with resins in the 1000–1500 mol weight range, use of the stoichiometric amount plut 5% excess of oxide will produce a resin of about 70 to 110 acid number that is desired to permit proper heat treatment.

Table IV below demonstrates the effect of acid number on resin properties. Resin XI was prepared by the method of Example 2, except that no additional propylene oxide was added to reduce the initial acid number thereof.

Table IV.—Effect of acid number on resin properties

|  | Resin XI | Example 2 | Plaskon 941 |
|---|---|---|---|
| Liquid Resin Properties: |  |  |  |
| Polyester Acid No | 85.5 | 31.1 | 30-40 |
| Catalyzed Pot Life, days | 5 | 7 | 7 |
| SPI Gel Time (150-190° F.), min | 4.4 | 6.7 | 4-5.5 |
| Peak Exotherm, °F | 394 | 397 | 400-420 |
| Time 190° F. to Peak Exotherm, min | 2.3 | 2.0 | 1.5-2.3 |
| ⅛" Cast Physical Properties: |  |  |  |
| Barcol Hardness | 49 | 47 | 45-50 |
| Flexural Strength, p.s.i. at Room Temp | 18,600 | 15,500 | 15,000-17,000 |
| Flexural Strength, p.s.i. at 160° F | 5,580 | 8,520 | 8,000-11,000 |
| Modulus of Elasticity, p.s.i. at Room Temp | 644,000 | 644,000 | 650,000-690,000 |
| Modulus of Elasticity, p.s.i. at 160° F | 133,000 | 222,000 | 250,000-300,000 |
| Tensile Strength, p.s.i. at Room Temp | 9,080 | 9,100 | 8,000-10,000 |
| Elongation in Tensile, percent | 1.7 | 1.8 | 1.5-1.9 |
| Heat Distortion Temperature (264 p.s.i. load),° C | 74 | 81 | 80-90 |

It will be readily understood that the foregoing examples are merely illustrative of the invention and that various other changes and modifications may be made therein, in addition to those referred to in the present specification, without departing from the scope and spirit of the invention.

Thus, the limiting pressure of 30 p.s.i.g. imposed on the reactions of the examples is obviously not mandatory. It was merely considered preferable since conventional reaction vessels of polyester resin producers are normally rated to withstand 30 p.s.i.g. so that operations at such pressure level are most convenient. It will be understood that higher reaction pressures may be employed if desired.

As is known in the polyester art, changes in the unsaturated acid anhydride to saturated acid anhydride molar ratio affect the reactivity of the resin with respect to styrene. For example, a molar ratio of maleic acid anhydride to phthalic acid anhydride of 1:1, as in Example 1, will produce a resin which is generally equivalent to commercially available materials. A faster curing (short gel time, higher peak exotherm), harder and stronger resin can be obtained by increasing the ratio in favor of maleic anhydride. Similarly, the alkylene oxide component may be based on mixtures thereof or mixtures of oxides and glycols. For example, mixtures containing propylene oxide and dipropylene glycol and the usual acid anhydrides have been found to give polyesters of particular interest. However, in the usual formulations utilizing dipropylene glycol, some water must be condensed out of the system in order to attain the desired molecular weight. In such case, the process may be conducted in manner similar to that described hereinbefore until the heat treatment is completed. Thereafter, while the temperature is maintained at 210° C., for example, the reactor may be purged with inert gas until sufficient water is removed to bring the resin molecular weight up to the desired level. The condensation progress of the reaction may be followed by conventional viscosity measurements.

We claim:

1. A process which comprises: (A) reacting together, at temperatures in the range of 30° to 150° C., (1) a substance selected from the group consisting of maleic acid anhydride and mixtures of maleic acid anhydride with anhydrides of other dicarboxylic acids, said mixtures containing at least 10 mol percent of maleic acid anhydride, with (2) an alkylene oxide selected from the group consisting of ethylene, propylene, and butylene oxides and mixtures of said oxides in the presence of (a) from 0 to 5.0%, based on the weight of the reaction mixture, of a catalyst selected from the group consisting of alkali metal salts, alkali metal hydroxides, alkaline earth metal salts, alkaline earth metal hydroxides, salts of organic amines and hydroxides of organic amines, and (b) from 0 to 4 gram mols of water per 1000 grams of (1) and (2), the minimum total amount of said catalyst and said water being at least .0075 gram mol per 1000 grams of (1) and (2), until said alkylene oxide is substantially completely reacted and a product having an acid number of from above 40 to 240 is obtained; and (B) thereafter, heat treating said product as the sole reactive medium at a temperature of from about 180° to 250° C.

2. A process which comprises: (A) reacting together, at temperatures in the range of 30° to 150° C., (1) a substance selected from the group consisting of maleic acid anhydride and mixtures of maleic acid anhydride with anhydrides of other dicarboxylic acids, said mixtures containing at least 10 mol percent of maleic acid anhydride, with (2) an alkylene oxide selected from the group consisting of ethylene, propylene, and butylene oxides and mixtures of said oxides in the presence of (a) from 0 to 5.0%, based on the weight of the reaction mixture, of a catalyst selected from the group consisting of alkali metal salts, alkali metal hydroxides, alkaline earth metal salts, alkaline earth metal hydroxides, salts of organic amines and hydroxides of organic amines, and (b) from 0 to 4 gram mols of water per 1000 grams of (1) and (2), the minimum total amount of said catalyst and said water being at least .0075 gram mol per 1000 grams of (1) and (2), until said alkylene oxide is substantially completely reacted and a product having an acid number of from above 40 to 240 is obtained; (B) heat treating said product as the sole reactive medium at a temperature of from about 180° to 250° C., and (C) thereafter, incorporating with said product, a sufficient additional amount of said alkylene oxide to reduce the acid number of the product to the range of from 20 to 40.

3. A process as claimed in claim 2, wherein the resulting product having an acid number in said range of from 20 to 40 is admixed with a compatible ethylenically unsaturated monomeric compound.

4. A process which comprises: (A) reacting together, at temperatures in the range of 30° to 150° C., (1) a substance selected from the group consisting of maleic acid anhydride and mixtures of maleic acid anhydride with anhydrides of other dicarboxylic acids, said mixtures containing at least 10 mol percent of maleic acid anhydride, with (2) an alkylene oxide selected from the group consisting of ethylene, propylene and butylene oxides, and mixtures of said oxides, in the presence of (a) from 0.05 to 5.0%, based on the weight of the reaction mixture, of a catalyst selected from the group consisting of alkali metal salts, alkali metal hydroxides, alkaline earth metal salts, alkaline earth metal hydroxides, salts of organic amines and hydroxides of organic amines; and (b) at least 0.5%, based on the weight of (1) and (2), of water, until said alkylene oxide is substantially completely reacted and a product having an acid number of from 65 to 125 is obtained; and (B) thereafter, maintaining said product as the sole reactive medium at a temperature of from 180° to 250° C. for at least 1.5 hours.

5. A process which comprises: (A) reacting together at temperatures in the range of 30° to 150° C., (1) a substance selected from the group consisting of maleic acid anhydride and mixtures of maleic acid anhydride and anhydrides of other dicarboxylic acids, said mixtures containing at least 10 mol percent of maleic acid anhydride, with (2) an alkylene oxide selected from the group consisting of ethylene, propylene, and butylene oxides, and mixtures of said oxides, in the presence of (a) from 0.05 to 5.0%, based on the weight of the reaction mixture, of a catalyst selected from the group consisting of alkali metal salts, alkali metal hydroxides, alkaline earth metal salts, alkaline earth metal hydroxides, salts of organic amines, and hydroxides of organic amines; and (b) at least 0.5%, based on the weight of (1) and (2), of water, until said alkylene oxide is substantially completely reacted and a product having an acid number of from 65 to 125 is obtained; (B) maintaining said product as the sole reactive medium at a temperature of from 180° to 250° C. for at least 1.5 hours; and (C) thereafter, incorporating with said product a sufficient additional amount of said alkylene oxide to reduce the acid number of the product to the range of from 20 to 40.

6. A process which comprises: (A) reacting together at temperatures in the range of 30° to 150° C., (1) a substance selected from the group consisting of maleic acid anhydride and mixtures of maleic acid anhydride with anhydrides of other dicarboxylic acids, said mixtures containing at least 10 mol percent of maleic acid anhydride with (2) an equimolar amount of an alkylene oxide selected from the group consisting of ethylene, propylene and butylene oxides, and mixtures of said oxides, in the presence of (a) from 0.05 to 5.0%, based on the weight of the reaction mixture, of a catalyst selected from the group consisting of alkali metal salts, alkali metal hydroxides, alkaline earth metal salts, alkaline earth metal hydroxides, salts of organic amines and hydroxides of organic amines, together with (b) at least 0.5%, based on the weight of (1) and (2), of water, until said alkylene oxide is substantially completely reacted and a product having an acid number of from 70 to 110 is obtained; (B) maintaining said product as the sole reactive medium at a temperature of from 180° to 250° C. for at least 1.5 hours; and (C) thereafter, adding .17 mol of said alkylene oxide to said product to reduce the acid number thereof to the range of from 20 to 40.

7. A process as claimed in claim 5, in which, after completion of the heat treatment in said temperature range of from 180° to 250° C., a sufficient amount of said alkylene oxide is added to the product to reduce the acid number thereof to the range of 20 to 40.

8. A process which comprises: (A) reacting together, at temperatures in the range of 70° to 110° C., and pressures not exceeding about 30 p.s.i.g., (1) a mixture of maleic acid anhydride and phthalic acid anhydride in the molar ratio from 1:1 to 1.5:1 with (2) a substantially stoichiometric amount, based on reactable acid components present, of propylene oxide, in the presence of (a) at least 0.125%, based on the weight of the reaction mixture, of NaOH, and (b) at least 1.44%, based on the weight of the reaction mixture, of water, until said alkylene oxide is substantially completely reacted and a product having an acid number of from 70 to 110 is obtained; (B) maintaining said product as the sole reactive medium at a temperature of approximately 210° C., for approximately 2 hours; and (C) thereafter, adding a sufficient amount of proylene oxide to said product to reduce the acid number thereof to approximately 30.

9. A process as claimed in claim 8, in which the product having an acid number of approximately 30 is admixed with styrene.

References Cited by the Examiner
UNITED STATES PATENTS

| | | | |
|---|---|---|---|
| 2,423,042 | 6/47 | Muskat | 260—75 |
| 2,779,783 | 1/57 | Hayes | 260—78.4 |
| 2,822,350 | 2/58 | Hayes | 260—78.4 |
| 2,890,195 | 6/59 | Phillips et al. | 260—78.4 |

FOREIGN PATENTS 1,034,854    7/58    Germany.

JOSEPH L. SCHOFER, *Primary Examiner.*